US006777361B2

(12) United States Patent
Aichele et al.

(10) Patent No.: US 6,777,361 B2
(45) Date of Patent: Aug. 17, 2004

(54) CERAMIC COMPOSITE

(75) Inventors: Wilfried Aichele, Winnenden (DE); Wolfgang Dressler, Vaihingen (DE); Christof Rau, Stuttgart (DE); Volker Knoblauch, Stuttgart (DE); Alexander Kloncynski, Rodgau (DE); Horst Boeder, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/169,662

(22) PCT Filed: Nov. 5, 2001

(86) PCT No.: PCT/DE01/04110

§ 371 (c)(1),
(2), (4) Date: Oct. 29, 2002

(87) PCT Pub. No.: WO02/38520

PCT Pub. Date: May 16, 2002

(65) Prior Publication Data

US 2003/0092557 A1 May 15, 2003

(30) Foreign Application Priority Data

Nov. 5, 2000 (DE) ........................................ 100 55 0827

(51) Int. Cl.[7] ......................... C04B 35/571; C04B 35/71
(52) U.S. Cl. .............................. 501/88; 501/89; 501/92; 501/97.1; 501/80; 501/81; 501/85; 501/96.2; 428/698; 264/625; 264/627
(58) Field of Search .............................. 501/80, 81, 85, 501/88, 89, 90, 91, 92, 96.2, 97.1, 97.2; 428/698; 264/625, 627

(56) References Cited

U.S. PATENT DOCUMENTS

| RE31,543 E | * | 3/1984 | Bank et al. ................. 523/435 |
| 4,996,174 A | * | 2/1991 | Birchall et al. ............... 501/87 |
| 5,376,599 A | * | 12/1994 | Oshima et al. ............... 501/90 |
| 5,387,480 A | * | 2/1995 | Haluska et al. ............. 428/698 |
| 5,492,958 A | * | 2/1996 | Haluska et al. ............. 524/439 |
| 6,083,860 A | * | 7/2000 | Matsuo et al. ................ 501/92 |
| 6,103,178 A | * | 8/2000 | Bujalski et al. ............. 264/470 |

FOREIGN PATENT DOCUMENTS

| DE | 195 38 695 | | 4/1996 |
| EP | 0 412 428 | | 2/1991 |
| EP | 0 536 866 | | 4/1993 |
| JP | 7-196986 | * | 8/1985 |

* cited by examiner

*Primary Examiner*—Karl Group
(74) *Attorney, Agent, or Firm*—Kenyon & Kenyon

(57) ABSTRACT

A ceramic composite material, for example, a ceramic molded body or a layer obtained by pyrolysis of a starting mixture, containing at least one polymer precursor material and at least one filler, which has an average particle size of less than 200 nm. Such a composite material may be used, for example, for producing fibers, filters, catalyst support materials, ceramic sheathed-element glow plugs, metal-containing reactive composite materials, porous protective shells for sensors, ceramic or partially ceramic coatings or microstructured ceramic components.

26 Claims, 1 Drawing Sheet

CERAMIC COMPOSITE

FIELD OF THE INVENTION

The present invention relates to a ceramic Composite material, for example, a ceramic molded body or a layer, as well as a use of the ceramic molded body or a layer.

BACKGROUND INFORMATION

European Published Patent Application No. 0 412 428 refers to a ceramic composite body and a method of producing same, in which an organosilicon polymer, as a precursor material, together with incorporated particles of hard material and/or other reinforcing components, as well as one or more metallic fillers, is subjected to pyrolysis. In pyrolysis, the decomposition products formed from the polymer compounds react with the metallic filler, which may result in a ceramic composite body having a matrix with particles of hard material and/or reenforce embedded components.

For example, carbides or nitrides of titanium, zirconium or other transition metals may be used as the hard material particles or reinforcing components as referred to, for example, in European Published Patent Application No. 0 412 428, in which the particle sizes of the powder particles are in the range of approximately 1 $\mu$m to approximately 300 $\mu$m.

The matrix formed from the organosilicon polymer after pyrolysis is a monophase or polyphase, amorphous, partially crystalline or crystalline matrix of silicon carbide, silicon nitride, silicon dioxide or mixtures thereof.

In addition to microscale powder materials, nanoscale powder materials may be single-phase or polyphase powders having particle sizes in the nanometer range. Due to their small particle dimensions, they are characterized by a very high proportion of particle boundaries or phase boundaries per volume. In addition, the physical, chemical and mechanical properties of such nanoscale powders may differ from those of conventional coarse-grained materials having the same chemical composition. For example, such nanoscale powders may have greater hardness, increased diffusivity and increased specific heat.

Nanoscale powdered materials may be produced by flame pyrolysis, gas condensation, spray conversion or crystallization of amorphous substances. Industrial production has advanced in the case of zirconium dioxide, silicon dioxide, titanium dioxide and aluminum oxide.

It is believed that the properties of ceramic composite materials having microscale fillers are determined largely by the properties of the fillers. Thus, local stress peaks or cracks may occur in the composite material when the properties of the matrix and fillers differ, e.g., different coefficients of thermal expansion. This may result in an increased failure rate of such components.

When using reactive microscale fillers as referred to, for example, in European Published Patent Application No. 0 412 428, the effect of which is based on reaction of the fillers with the ambient matrix, only an incomplete reactive conversion of filler may be achieved in the edge area of the filler grains.

SUMMARY OF THE INVENTION

An object of the present invention is to provide a ceramic composite material, which may be suitable, for example, for producing ceramic molded bodies or layers and with which the profile of electrical and physical properties may be easily and reliably adjusted.

Another object of the present invention is to provide a ceramic composite material, the electric properties of which, porosity, high-temperature stability, mechanical strength, i.e., fracture toughness and homogeneity are improved in comparison with the related art.

It is believed that an exemplary ceramic composite material according to the present invention has the advantage in that the profile of electrical and physical properties of the ceramic composite material obtained after pyrolysis may be adapted to a profile of properties predetermined for the respective application, i.e., the composition of the composite material may be tailored to this profile of properties. For example, the large selection of fillers may permit the properties of the resulting ceramic composite materials to be varied or adjusted over a wide spectrum.

In addition, it is believed that an exemplary ceramic composite material according to the present invention has the advantage in that, due to the small particle size of the reactive filler, the process temperatures may be lowered and the process times required for a complete reaction may be shortened in comparison with the related art, so that with the process temperatures required in the past, liquid or volatile fillers may still be solid and thus may be used at the pyrolysis and sintering temperatures. Furthermore, unwanted phase reactions, which may occur at higher temperatures, i.e., reactions between the matrix and filler, may be avoided by using reduced process temperatures.

It is believed that one advantage of the composite material according to the present invention is that the porosity of the composite material may be adjusted in a defined manner using the fillers, the combination of a suitable nanoscale filler with defined pyrolysis conditions thus allowing the production of both highly porous composite materials and dense composite materials by varying the pyrolysis conditions, while otherwise using the same polymer precursor material, i.e., the same starting mixture.

Exemplary porous ceramic composite materials according to the present invention may also have a very good spalling resistance and may be applied to various applications, for example, as lightweight structural materials, as porous protective shells for sensors, as filters, as catalyst support materials or as a matrix for infiltrated reactive composite materials, while exemplary high-density ceramic composite materials according to the present invention have an increased mechanical strength, improved fracture toughness and improved corrosion resistance.

In production of a n exemplary ceramic composite material according to the present invention, shaping and production methods may be used, so that even ceramic fibers, layers and molded bodies of different sizes or having a complex geometry are readily obtainable, which may permit an exemplary composite material to be applied to a broad spectrum of applications. For example, shaping methods, such as compression molding, injection molding, joining and fiber extrusion may be used. With regard to the production method used, pyrolysis, under a protective gas and laser pyrolysis may be employed.

In this regard, a simple and reliable control or adjustability of the flow properties and pourability of the starting mixture may be achieved through the type and quantity of the nanoscale filler. This may also be true of the process parameters in powder transport, in cold molding, in injection molding, in spin coating or in dip coating.

Moreover, due to the small size of the filler, detailed replicas of embossed, cast or injection molded shapes may also be produced by pouring the starting mixture into a mold and then performing pyrolysis. In addition to the fidelity in detail, these replicas may have a high surface quality, allowing details having dimensions of less than 1 μm to be molded.

It is also believed that an exemplary ceramic composite material according to the present invention has the advantage in that, due to the use of highly dispersed insulating fillers, the electric resistance of the composite material is increased significantly and the long-term stability of this electric resistance may be improved. In addition, due to the improved homogeneity and stability of the thermal and electrical properties of the resulting composite material, reliability may also increase.

It is also believed that another advantage of an exemplary ceramic composite material according to the present invention is that it may permit high degrees of filling and short pyrolysis times, and the flow properties of the polymer precursor materials used may be regulated through the addition of suitably selected fillers. Thus, for example, suspensions of starting mixtures that remain stable and processable over long periods of time may-be produced.

The polymer precursor material may be an oxygen-containing polysiloxane precursor or a polysilazane precursor that is stable in air, since these materials allow processing in air and thus may allow the production of inexpensive composite materials. In addition, the resulting pyrolysis product may be chemically stable with regard to oxidation and corrosion and at the same time may be unobjectionable from a health standpoint.

In addition to the nanoscale fillers having an average particle size of less 200 nm, other fillers, such as a powdered aluminum oxide ($Al_2O_3$) having a larger particle size of 500 nm to 10 μm, for example, 500 nm to 3 μm, may also be used. This may broaden the spectrum of achievable electrical and physical properties and thus may broaden the spectrum of applications of the resulting composite materials. For example, the electric resistance of the resulting ceramic composite material may increase by several orders of magnitude at room temperature and also at temperatures greater than 1200° C. Also, when conventional microscale aluminum oxide fillers are replaced largely or completely by nanoscale silicon dioxide, for example, amorphous silicon dioxide or corresponding highly dispersed silicic acid, for example, pyrogenic silicic acid, the long-term stability of the mechanical and electrical properties of the ceramic composite material obtained may be improved at temperatures above 1200° C. Simultaneously, an increase in the allowed heating rates in pyrolysis and a shortening of the time required for shaping by compression molding may be achieved.

With regard to the highest possible specific electric resistance of the composite material, it is believed to be advantageous if, in addition to the polymer precursor material and instead of or in addition to a conventional, microscale aluminum oxide filler, the starting mixture also contains nanoscale silicon dioxide, for example, amorphous silicon dioxide, nanoscale silicon dioxide provided having a carbonaceous and/or hydrophilic surface modification, pyrogenic silicic acid or silicic acid provided with a carbonaceous and/or hydrophilic surface modification to which may be added a boron compound in the amount of 10 wt % to 30 wt %, for example, a boron oxide such as $B_2O_3$.

In this connection, the specific electric resistance of the resulting composite material depends not only on the particle size of the filler but also on the BET surface area of the filler, so that the resistance may be easily adjustable to unexpectedly high values. The surface properties of the filler are additional variables, which effect the resulting specific electric resistance of the composite material, for example, in conjunction with a change in the BET surface area. Thus, the transition from a hydrophobic surface to a hydrophilic surface of the filler particles, for example, may result in an increase in the specific electric resistance obtained.

Especially high values for the specific electric resistance may also be achieved, for example, when the filler, for example, $SiO_2$ or silicic acid, is used in an amount of at least 9 vol % in the starting mixture, whereby at the same time, another filler such as $Al_2O_3$, which may optionally be used in the starting mixture, should amount to less than 7 vol %, for example, less than 3 vol %.

Due to the small particle size of the filler, the surface quality of coatings produced with this ceramic composite material may be improved because the starting mixture applied before pyrolysis to the surface of a substrate to be coated penetrates into all the surface detects and irregularities in this substrate, thereby increasing adhesion of the coating, as well as equalizing irregularities and defects in the substrate-layer interface.

With respect to nanoscale fillers, at least approximately complete conversion of these fillers with the surrounding matrix in pyrolysis may be achieved in the ceramic composite material. This may result in, for example, a definite shortening of pyrolysis cycles. Furthermore, chemical reaction of the nanoscale filler with the polymer precursor material may proceed more rapidly in comparison with microscale fillers.

Also, by adding a suitable stabilizer to the starting mixture, for example, production of a stable suspension of the polymer precursor material with the filler in an organic solvent may be produced. For example, the stability of such a suspension with respect to sedimentation may increases in comparison with similar starting mixtures having microscale fillers, so that coating methods performed with such suspensions by dip coating or spin coating may be facilitated. Furthermore, the nanoscale filler may be suitable as a dispersant for a microscale filler used concurrently.

DETAILED DESCRIPTION

Figure 1:
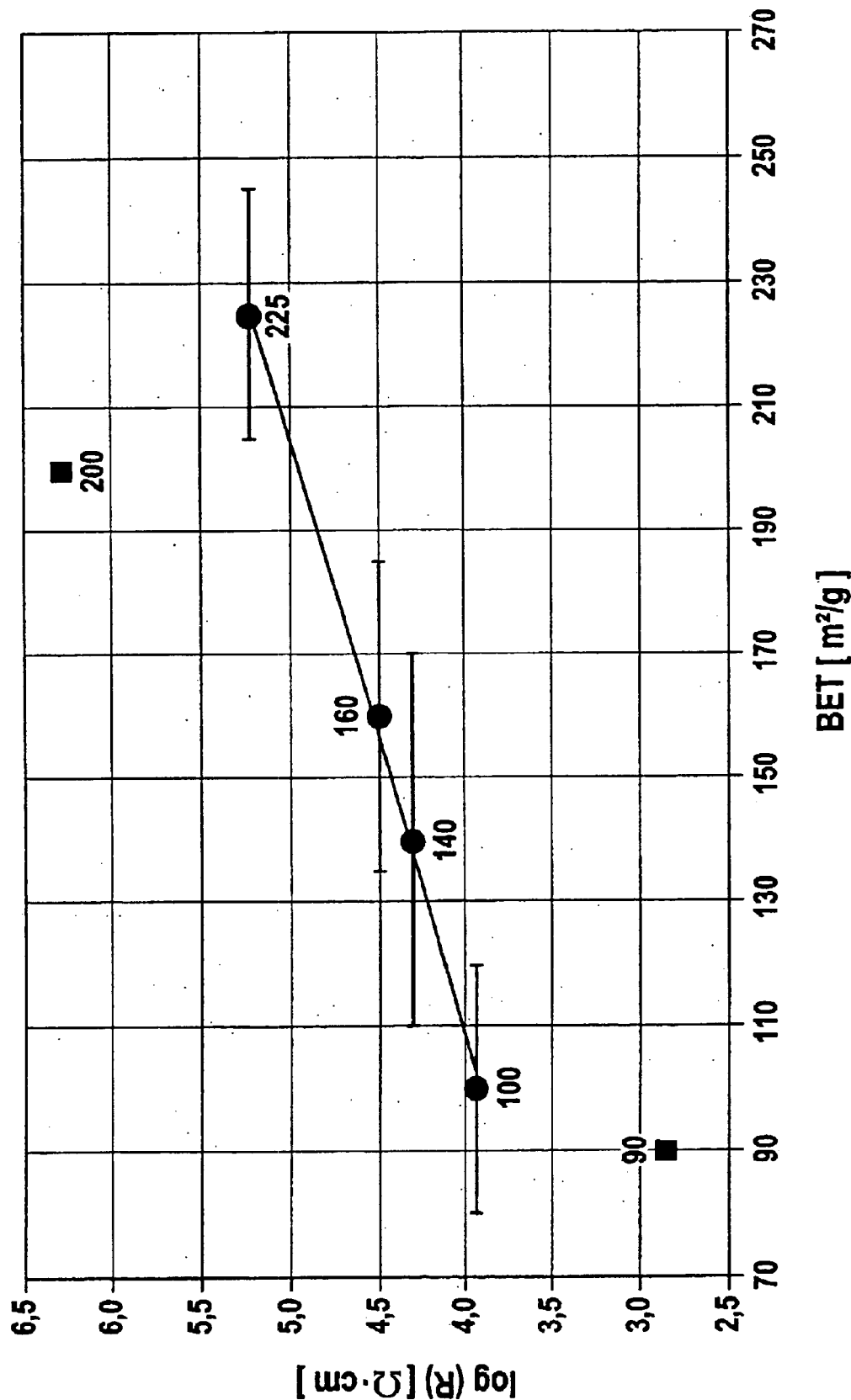
FIG. 1 is a diagram showing specific electric resistance R of the composite ceramic as a function of the BET surface area of highly dispersed silicic acid having a hydrophobic surface as the filler or highly dispersed silicic acid having a hydrophilic surface as the filler.

Initially placed in a milling pot are 64.4 g powdered polymethylsiloxane, 0.6 g of a catalyst and 35.6 g nanoscale silicon dioxide powder, for example, amorphous silicon dioxide powder or highly dispersed nanoscale pyrogenic silicic acid having a BET surface area of 140 $m^2/g$ (also referred to as highly dispersed silicic acid) on 1000 g iron milling balls. This corresponds to a degree of filling of 20 vol % silicon dioxide or silicic acid, based on the starting mixture of the polymer precursor material polymethylsiloxane and $SiO_2$ as the filler. The filler silicon dioxide or the starting pyrogenic silicic acid also has an average particle size of less 200 nm. For example, the powder particles in this exemplary embodiment are primary particles having an average particle size of, for example, 5 nm to 80 nm or aggregates of such primary particles, but the average particle size of the aggregates is less than 200 nm. An $SiO_2$ powder or a corresponding highly dispersed silicic acid may be used as the nanoscale filler, which contains the powder particles as primary particles having an average particle size of 5 nm to 30 nm.

The added catalyst initiates or accelerates the crosslinking of the polymer precursor material in compression molding or other suitable shaping operations. For example, catalysts, such as aluminum acetylacetonate or zirconium acetylacetonate may be used for this purpose. In addition, a catalytically active surface may be provided on the nanoscale filler, so that the filler may assume the role of or replace the catalyst or additionally act as an alternative to the catalyst.

After a milling time of a few minutes for the starting mixture, the resulting powder mixture, having the precursor material and the filler, is separated from the iron balls and screened through a 150 μm screen. Then, the screened powder mixture is poured into a mold, where molding is performed at a pressure of 100 MPa to 200 MPa. Then, the molded powder mixture is crosslinked at a compression molding temperature of 160° C. to 200° C. and a pressure of 3 MPa to 6 MPa. Then, the resulting molded body or the molded starting mixture is pyrolyzed in an argon atmosphere at a temperature of 1050° C. to 1350° C., for example, approximately 1300° C., resulting in the a ceramic composite body.

The following table shows comparative experiments between a ceramic composite material having an aluminum oxide filler having an average particle size of approximately 1 μm and a specific electric resistance of approximately $10^{15}$ Ωcm and a comparable ceramic composite material in which, however, the microscale aluminum oxide powder has been replaced by nanoscale silicon dioxides having an average particle size of less than 200 nm, a specific electric resistance of approximately $10^9$ Ωcm and a BET surface area of approximately 140 m²/g. The starting mixture of the composite materials according to the following table also contains molybdenum disilicide powder and silicon carbide powder as fillers in addition to the polymer precursor material polysiloxane. However, these fillers have been kept constant with regard to particle size and amount.

TABLE 1

| Polysiloxane (vol %) | SiC (vol %) | MoSi$_2$ (vol %) | Al$_2$O$_3$ (vol %) | SiO$_2$ (vol %) | Specific electric resistance R (Ωcm) |
|---|---|---|---|---|---|
| 65% | 8% | 13% | 14% | 0% | <$10^3$ |
| 60% | 8% | 13% | 9% | 10% | <$10^3$ |
| 57% | 8% | 13% | 5% | 17% | approximately $10^3$ |
| 65% | 8% | 13% | 0% | 14% | >$10^3$ |

The increased specific electric resistances R achieved according to the preceding table by using nanoscale pyrogenic silicic acid or SiO$_2$ particles remain largely stable, even after prolonged storage times at a temperature of 1300° C., and are significantly higher than the value observed in corresponding composite materials, which do not contain a nanoscale filler. However, mixtures, in which SiO$_2$ or silicic acid has been added in the form of powders having an average particle size of more than 1 μm have a high porosity, a low electric resistance and an inadequate high-temperature stability.

A second embodiment begins with the same starting mixture, which has already been described with respect to the first exemplary embodiment according to the present invention described above. In this exemplary embodiment, however, the open porosity of the resulting ceramic composite material is adjusted by varying the pyrolysis time and the final temperature in pyrolysis. In this way, an open porosity amounting to between approximately 1% and more than 30% may be obtained by using the same starting mixture composition, i.e., using polysiloxane as the polymer precursor material and adding nanoscale SiO$_2$, by varying the pyrolysis time and the final temperature in pyrolysis, as illustrated in the following table.

TABLE 2

| Pyrolysis time | Final temperature | Relative weight loss | Relative shrinkage | Open porosity |
|---|---|---|---|---|
| 22.5 h | 1100° C. | 25.5% | 14.8% | 30% |
| 34.0 h | 1100° C. | 24.4% | 14.2% | 30% |
| 37.3 h | 1300° C. | 24.8% | 18.1% | 13% |
| 60.0 h | 1300° C. | 25.3% | 20.1% | 5% |
| 102.5 h | 1300° C. | 24.8% | 20.3% | <1% |

In addition to dry milling of the powder mixture of the precursor material and filler in a ball mill, a conventional wet processing method may be used for producing the starting mixture described above. In this case, the polymer precursor material, e.g., polysiloxane, is first dissolved in acetone with the catalyst to homogenize the filler, and then the nanoscale filler is incorporated into this mixture. Next, this suspension is mixed, for example, for two hours using a magnetic stirrer and finally is vacuum dried. In this procedure, the starting mixture is not heated, so that there is no thermal crosslinking of the polymer precursor material before compression molding or shaping.

Mixing the precursor material and the filler in a mixer, for example, a heated mixer, and then kneading the resulting granulated mass, offers an other manner of incorporating the nanoscale filler into the precursor material . As in dry milling, no additional solvent may be necessary.

By using a vibrating screen, the resulting or used powder or powder mixtures may be first freed of uncrushed, i.e., unmilled, agglomerates before pyrolysis or before a molding step. The mesh of this screen may be, for example, 150 μm.

In addition to compression molding, injection molding may be used to shape the starting mixture before pyrolysis.

Moreover, pyrolysis of the prepared starting mixture to form the ceramic composite material may be performed in an inert gas atmosphere, using final temperatures of 600° C. to 1400° C., depending on the precursor material and the filler.

After pyrolysis, a ceramic composite material is obtained, in which the filler either forms at least partially nanoscale inclusions in a matrix formed essentially by the polymer precursor material or in which the filler has reacted with the matrix material so that there is little or no differentiation between the filler and matrix, due to diffusion processes. In this case, a largely homogeneous ceramic composite material, in which the filler has reacted with gases released during pyrolysis, for example, may be formed from the starting mixture with the filler in pyrolysis.

The filler first used in the starting mixture may also undergo thermal decomposition in pyrolysis and/or it may react with the precursor material so that, for example, nanoscale pores formed in the matrix may be at least partially attributable to pyrolysis of the filler in the matrix. The average resulting pore size amounts to less than 200 nm, for example, 5 nm to 100 nm, depending on the average particle size of the filler used.

In addition to the silicon dioxide described above, other oxides, nitrides or carbides of silicon, aluminum, titanium, zirconium, boron, tungsten, vanadium, hafnium, niobium, tantalum or molybdenum or a mixture thereof, e.g., in the form of oxycarbides, oxynitrides, carbonitrides or oxycarbonitrides may also be used as nanoscale fillers.

In addition, the nanoscale filler may be a metallic powdered filler and/or a filler containing gold, palladium, platinum, rhodium or iridium, e.g., in the form of a sol with nanoscale colloids contained therein or a suspension containing this metallic filler.

If the nanoscale filler at first is to be at least mostly decomposed in pyrolysis to form pores in the composite material, an organic filler, such as nanoscale carbon particles or nanoscale carbon black or nanoscale organic polymers may be suitable as the filler. Depending on the amount of the filler, the pyrolysis temperature and the duration of pyrolysis, the open porosity of the ceramic composite material obtained with these fillers may be adjusted to levels between 1% and 50%, the pyrolysis, for example, being followed by aging in an oxygen-containing atmosphere, which allows carbon to burn-off as thoroughly as possible.

Suitable polymer precursor materials include a variety of known precursor materials, such as organosilicon polymer compound, for example, polysiloxanes, polysilanes, polycarbosilanes or polysilazanes, organozirconium polymer compounds, organoaluminum polymer compounds, organotitanium polymer compounds, boron-containing polymer precursor materials or mixtures or intermediates of these precursor materials.

In addition, a stabilizer and a solvent, e.g., an organic solvent, such as acetone or an alcohol or water may be added to the starting mixture, depending on the individual case. In any case, the amount of nanoscale filler in the starting mixture should be between 2 vol % and 50 vol %.

With processing properties otherwise being the same, the specific electric resistance of the resulting ceramic composite material may be increased by several orders of magnitude at both room temperature and temperatures >1200° C. when a conventional coarse filler, such as $Al_2O_3$, is replaced at least largely or completely by nanodisperse, for example, amorphous silicon dioxide (also referred to as standard $SiO_2$) or highly disperse, for example, pyrogenic silicic acid (HDS).

Also, the filler permits the coefficient of thermal expansion of a conductive ceramic composite material to be adapted, for example, to that of an adjacent nonconducting ceramic composite material bonded to it through the comparatively low coefficient of thermal expansion of silicon dioxide.

Also, if only a small amount of nanodispersed $SiO_2$ is added to the composite material for adjusting the coefficient of thermal expansion and increasing the specific electric resistance of the composite material, and if working with a large amount of comparatively coarse $Al_2O_3$, i.e., an amount of more than 7 vol %, in many cases, more than 3 vol %, no significant desired increase in the specific electric resistance may be observed.

The use of a microscale additional filler, such as $Al_2O_3$ together with the nanoscale filler has positively effects a desired surface vitrification of the ceramic composite material, which may be used as a ceramic heater, for example, which may result in an improved high-temperature stability, for example, when the amount of nanoscale filler is greater than 9 vol %, for example, significantly greater than 10 vol %.

In another exemplary embodiment according to the present invention, as an additional parameter, the BET surface area of the filler used, which may be highly dispersed silicic acid (HDS) or powdered, for example, amorphous $SiO_2$, is altered with otherwise the same composition of the starting mixture according to Table 1. As part of these experiments, the properties of the surface of the nanoscale filler have a considerable effect on the specific electric resistance ultimately achieved of the composite material.

For example, in the case of a high BET surface area of the filler, a definitely increased specific electric resistance and thus a very good insulating ceramic composite material may be obtained, while the amount of another microscale filler, such as $Al_2O_3$ in the starting mixture is greater than 2%.

Through the targeted adjustment of the BET surface area of the filler in the starting mixture to largely or completely replace the microscale filler $Al_2O_3$, which would otherwise be conventional in the starting mixture by highly dispersed nanoscale, for example, amorphous $SiO_2$ or highly dispersed silicic acid, without causing a relevant reduction in the specific electric resistance of the resulting ceramic composite material.

Therefore, the differentiated use of, for example, highly dispersed silicic acids, i.e., nanoscale, for example, amorphous, $SiO_2$ powder particles having various BET surface areas and various surface modifications as fillers may thereby influence, in a controlled manner, the electric properties of the ceramic composite material produced by pyrolysis.

By using highly dispersed silicic acid (HDS), e.g., corresponding nanoscale, for example, amorphous, $SiO_2$ powder particles having a BET surface area of at least 50 $m^2/g$, for example, 90 $m^2/g$, up to 450 $m^2/g$ with otherwise the same composition of the starting mixture, the specific electric resistance of the composite material may be increased. The increase in specific resistance is greater, because, at the same BET surface area, instead of a highly dispersed silicic acid having a hydrophobicized surface, i.e., a pyrogenic nanoscale silicic acid, for example, a highly dispersed silicic acid without surface hydrophobicization or with a hydrophilic surface is used.

Two additional parameters as the BET surface area and the properties of the surface of the tiller (hydrophilic/hydrophobic) may allow the mechanical properties of the composite material, such as the coefficient of thermal expansion or the surface vitrification properties, to be adjusted to the respective individual case in a wide range, in addition to adjusting the specific electric resistance. In addition, varying the BET surface area of the nanoscale filler also influences the pyrolysis rate, sintering properties, porosity and viscosity of the starting mixture and the resulting composite material.

FIG. 1 illustrates a starting mixture containing 60 vol % polysiloxane, 10 vol % silicon carbide, 13 vol % molybdenum disilicide and 17 vol % $SiO_2$ particles or highly dispersed silicic acid having an average particle size of less than 200 nm as nanoscale filler. Then, a ceramic composite material was produced from this starting mixture, and the specific electric resistance R ($\Omega$cm) was determined as a function of the BET surface area ($m^2/g$) of the nanoscale filler.

The circular measurement points in FIG. 1 show measurements using a nanoscale, highly dispersed silicic acid having the BET surface area indicated, in which the powder particles have a hydrophobic surface area obtained by a carbonaceous surface modification (pyrolysis). The squares at a corresponding particle size or particle size distribution of the powder particles indicate measurement points obtained by using highly dispersed silicic acid of the stated BET surface area having a hydrophilic surface.

The increase in specific electric resistance R as a function of the BET surface area may be greater when using hydrophilic highly dispersed silicic acid than when using hydrophobic highly dispersed silicic acid. Furthermore, the BET surface area of the nanoscale filler may have a significant influence on resulting specific electric resistance R of the composite material. Specific electric resistance R, as shown in FIG. 1, are presented on the y axis in a logarithmic scale.

Starting with a composition according to Table 1 having an $Al_2O_3$ content of 5 vol %, replacing the highly dispersed pyrogenic silicic acid having a BET surface area of 140 m²/g by a corresponding highly dispersed pyrogenic silicic acid having a BET surface area of 225 m²/g may permit the amount of highly dispersed silicic acid to be reduced in this starting mixture and through a correspondingly greater amount of $Al_2O_3$ having an average particle size of approximately 1 µm, polysiloxane and conductive molydenum disilicide, i.e., a starting mixture having 60 vol % polysiloxane, 8 vol % silicon carbide, 13 vol % molydenum disilicide, 6 vol % $Al_2O_3$ and 13 vol % $SiO_2$ (highly dispersed pyrogenic silicic acid) may be replaced, while achieving an increase in specific electric resistance R of the composite material from approximately $10^3$ Ωcm to more than $10^4$ Ωcm.

What is claimed is:

1. A ceramic composite material comprising a matrix and nano-scale inclusions obtained by pyrolysis of a starting mixture, said starting mixture comprising:
   at least one polymer precursor material; and
   at least one filler, wherein the filler has an average particle size less than 200 nm;
   and the at least one filler includes boron oxide.

2. The ceramic composite material of claim 1, wherein the filler includes a powder having an average powder particle size of less than 200 nm, and the powder particles are one of primary particles having an average particle size of between 5 nm and 80 nm, and aggregates of the primary particles.

3. The ceramic composite material of claim 1, wherein the at least one filler further includes a material that decomposes thermally during pyrolysis and forms at least some pores, and the average size of the pores is less than 200 nm.

4. The ceramic composite material of claim 1, wherein the at least one filler further includes one of the following:
   at least one of an oxide, nitride, boride of silicon, carbide of silicon, aluminum, titanium, zirconium, tungsten, vanadium, hafnium, niobium, tantalum, and molybdenum, and
   a mixture of at least one of oxycarbides, oxynitrides, carbonitrides, and oxycarbonitrides.

5. The ceramic composite material of claim 1, wherein the at least one filler further includes at least one of a metallic filler and a filler containing one of gold particles, palladium particles, platinum particles, rhodium particles and iridium particles.

6. The ceramic composite material of claim 1, wherein the at least one filler further includes an organic filler.

7. The ceramic composite material of claim 1, wherein the at least one filler further includes at least one of silicon dioxide, silicon dioxide having at least one of a carbonaceous and a hydrophilic surface modification, pyrogenic silicic acid and silicic acid having at least one of a carbonaceous and a hydrophilic surface modification.

8. The ceramic composite material of claim 1, wherein an open porosity of the composite material is between 1% and 50%.

9. The ceramic composite material of claim 1, wherein the polymer precursor material includes organosilicon polymer compound.

10. The ceramic composite material of claim 1, wherein the starting mixture includes at least one of a stabilizer and a solvent.

11. The ceramic composite material of claim 1, wherein an amount of the at least one filler is between 2% and 50% by volume.

12. The ceramic composite material of claim 1, wherein the starting mixture includes a catalyst material that one of initiates and accelerates crosslinking of the polymer precursor material at least one of before and during pyrolysis.

13. The ceramic composite material of claim 1, wherein the at least one filler has a BET surface area of at least 50 m²/g.

14. The ceramic composite material of claim 1, wherein the starting mixture includes a second filler.

15. The ceramic composite material of claim 1, wherein the starting mixture includes a first filler that is at least 9 vol % and a second filler that is less than 7 vol %.

16. A method of using a ceramic composite material obtained by pyrolysis of a starting mixture, the method comprising:
   providing the ceramic composite material obtained by pyrolysis of the starting mixture, the ceramic composite material including at least one polymer precursor material, and at least one filler, wherein the filler includes boron oxide and has an average particle size of less than 200 nm; and
   forming the ceramic composite material to produce at least one of a fiber, a lightweight structural material, a filter, a catalyst support material, a ceramic sheathed-element glow plug, a metal-containing reactive composite material, a porous protective shell for a sensor, a ceramic coating, a partially ceramic coating and a microstructured ceramic component.

17. The ceramic composite material of claim 1, wherein the ceramic composite material includes one of a ceramic molded body and a layer.

18. The ceramic composite material of claim 3, wherein the average size of the pores is between 5 nm and 100 nm.

19. The ceramic composite material of claim 6, wherein the organic filler includes a filler containing nanoscale carbon particles.

20. The ceramic composite material of claim 1, wherein an amount of the boron oxide is between 10 wt % and 30 wt %.

21. The ceramic composite material of claim 9, wherein the organosilicon polymer compound includes polysiloxane.

22. The ceramic composite material of claim 12, wherein the catalyst material includes one of aluminum acetylacetonate and zirconium acetylacetonate.

23. The ceramic composite material of claim 13, wherein the BET surface area is between 90 m²/g and 450 m²/g.

24. A ceramic composite material obtained by pyrolysis of a starting mixture, comprising:
   at least one polymer precursor material; and
   a first filler, wherein the first filler has an average particle size of less than 200 nm;
   wherein the starting mixture includes a second filler; and
   wherein the second filler includes an aluminum compound.

25. The ceramic composite material of claim 24, wherein the aluminum compound includes $Al_2O_3$, the $Al_2O_3$ having an average particle size of between 500 nm and 3 µm.

26. The ceramic composite material of claim 15, wherein the second filler is less than 3 vol %.

* * * * *